United States Patent [19]

Brown et al.

[11] 4,233,677
[45] Nov. 11, 1980

[54] AUTOMATIC SYSTEM AND METHOD FOR TESTING MARINE STREAMERS OF SEISMIC EXPLORATION SYSTEMS

[75] Inventors: Earl J. Brown, Corona; Swan A. Sie, Placentia, both of Calif.

[73] Assignee: Chevron Research Company, San Francisco, Calif.

[21] Appl. No.: 879,540

[22] Filed: Feb. 21, 1978

[51] Int. Cl.³ ............................................. G01V 1/38
[52] U.S. Cl. .................................. 367/13; 73/1 DV; 367/15
[58] Field of Search ............ 340/5 C, 7 R; 324/83 D, 324/83 FE; 73/1 DV; 367/13

[56] References Cited

U.S. PATENT DOCUMENTS

| | | | |
|---|---|---|---|
| 2,748,348 | 5/1956 | McCarter | 73/1 DV |
| 3,858,169 | 12/1974 | Bardeen | 73/1 DV |
| 3,930,216 | 12/1975 | Hall, Jr. | 340/5 C |
| 4,003,018 | 1/1977 | McCormick | 340/5 C |
| 4,015,202 | 3/1977 | Fredriksson et al. | 324/83 FE |
| 4,043,175 | 8/1977 | Fredriksson et al. | 340/5 C |
| 4,052,694 | 10/1977 | Fredriksson | 340/17 R |
| 4,160,228 | 7/1979 | Hix et al. | 340/7 R |
| 4,166,270 | 8/1979 | Brown et al. | 73/1 DV |

OTHER PUBLICATIONS

"Digital Systems Checks Acoustic Underwater Transducer", by C. Covey, *Undersea Technology*, vol. 6, No. 12, Dec. 1965, pp. 39-41.

*Primary Examiner*—Howard A. Birmiel
*Attorney, Agent, or Firm*—R. L. Freeland, Jr.; H. D. Messner

[57] ABSTRACT

In accordance with the present invention, a marine streamer test system and method (MARSTEST) is disclosed for testing field-worthiness of hydrophone sections within the streamer under both passive and dynamic operating conditions. With regard to a passive operating state, five (5) test parameters are automatically generated and compared with upper and lower limits stored within a mini-computer housed aboard the marine exploration boat. Any out-of-specification values trip an alarm network and a printer to warn of the malfunctioning streamer section. Result: replacement or other repair can be effected. With regard to dynamic operating conditions, acceptable "signature" characteristics of the streamer (such characteristics can be 2 or more of the above 5 parameters) are stored within the computer aboard the exploration boat and are compared with actually generated field parameter values acquired during operations, say between "shots", i.e., between the sequential activation of the seismic source used in the generation of the seismic data. Result: any seismic data acquired by the suspect hydrophone section can be properly interpreted in view of the malfunctioning state of that section.

22 Claims, 21 Drawing Figures

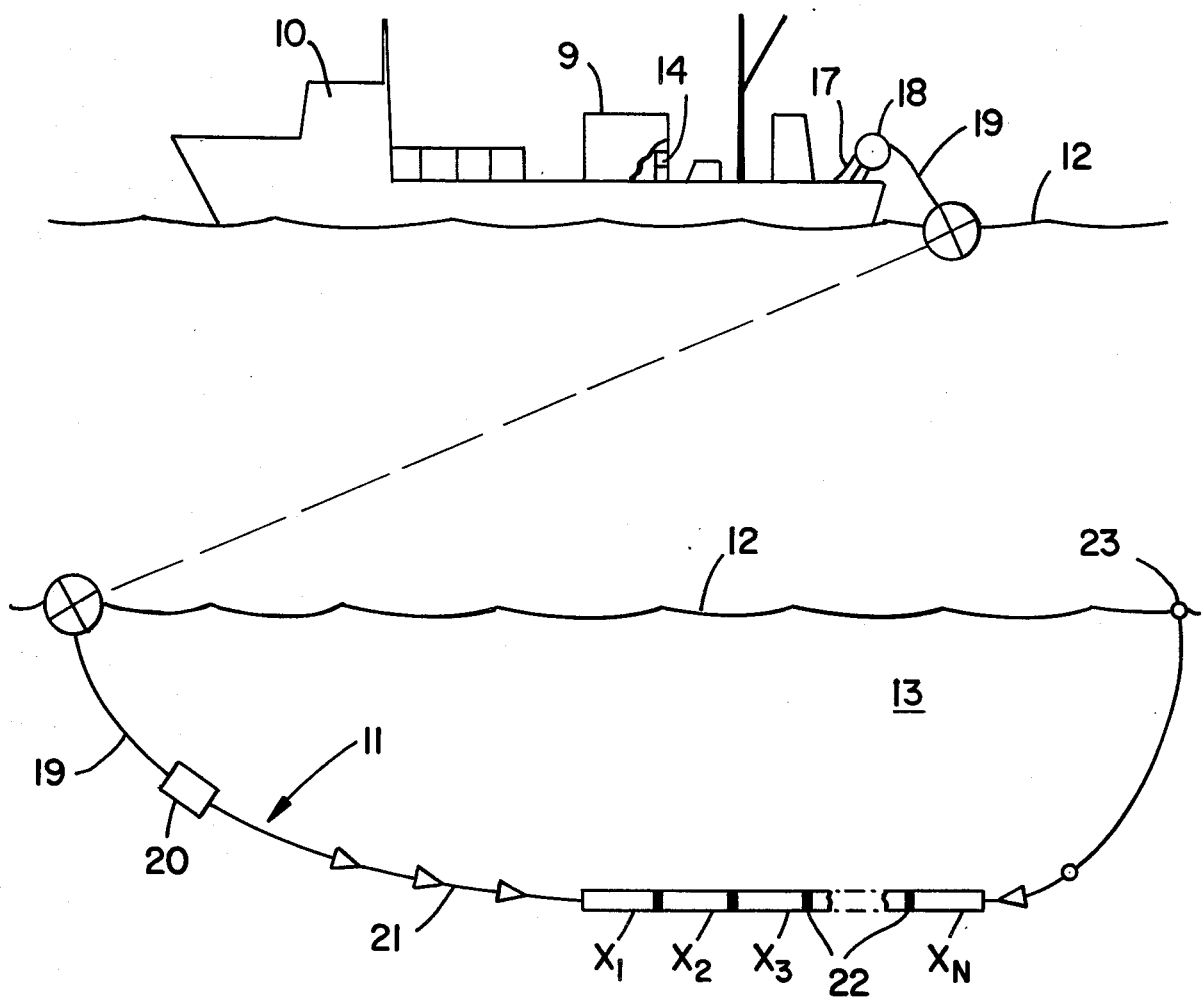
FIG_1
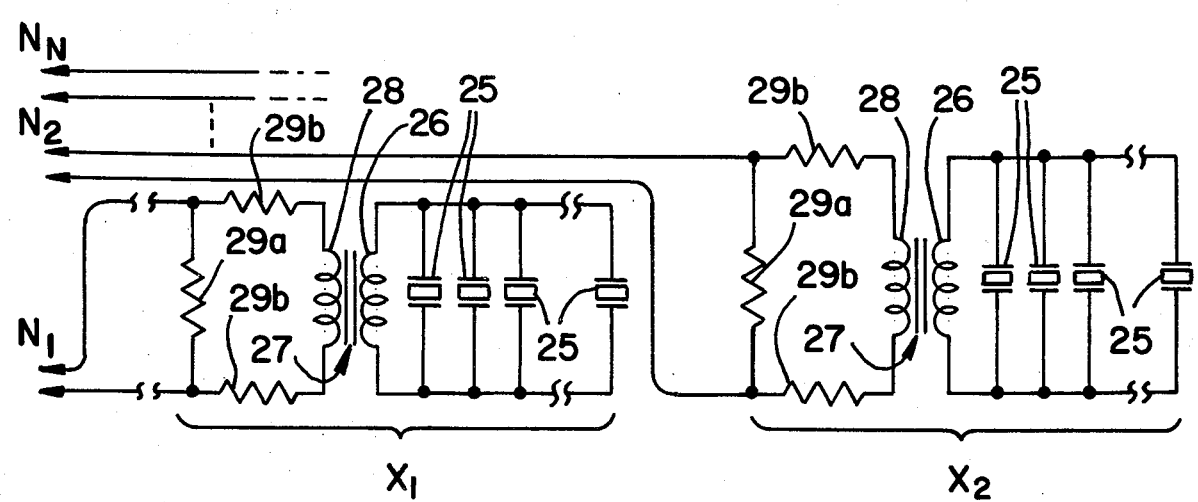
FIG_2

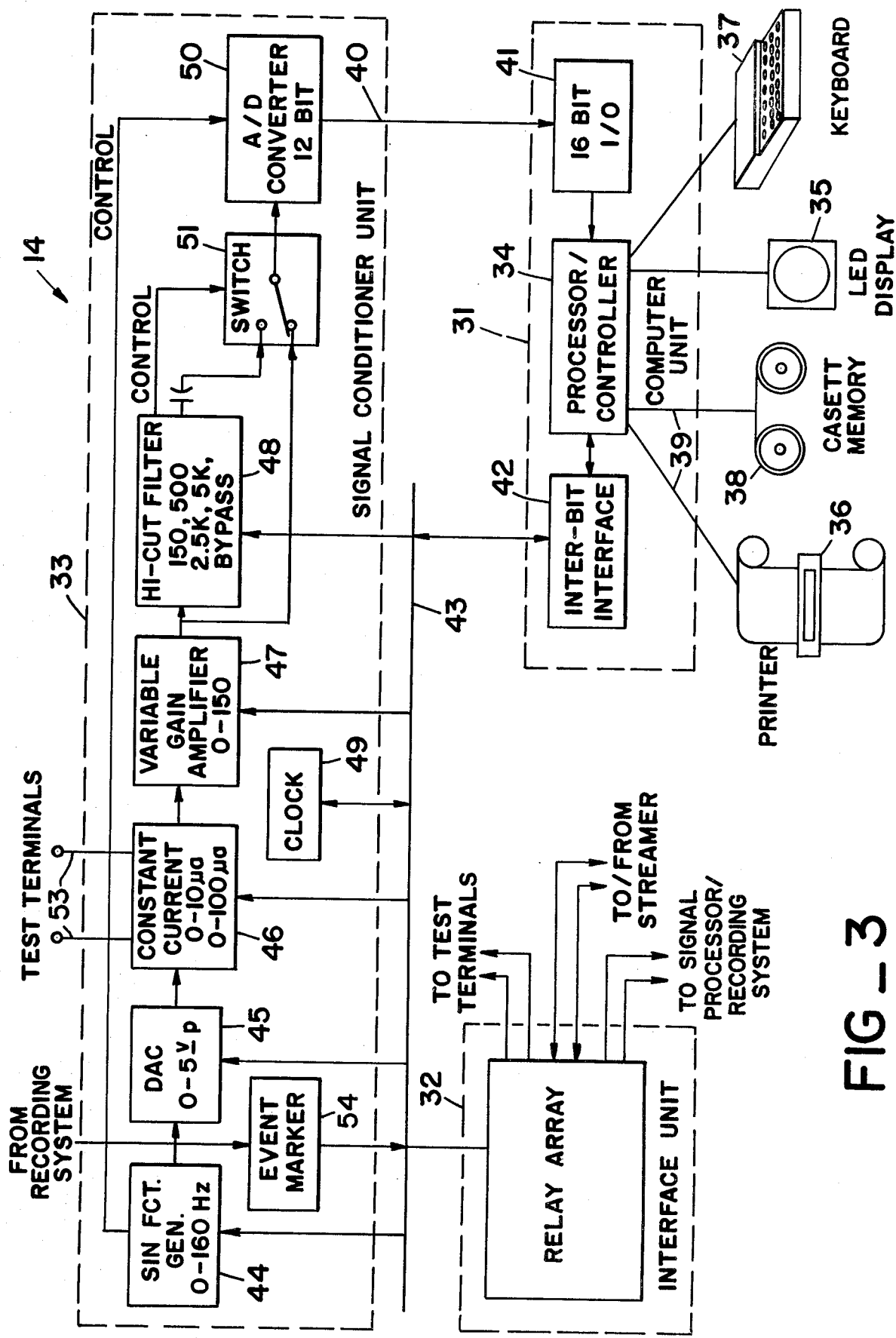
FIG_3

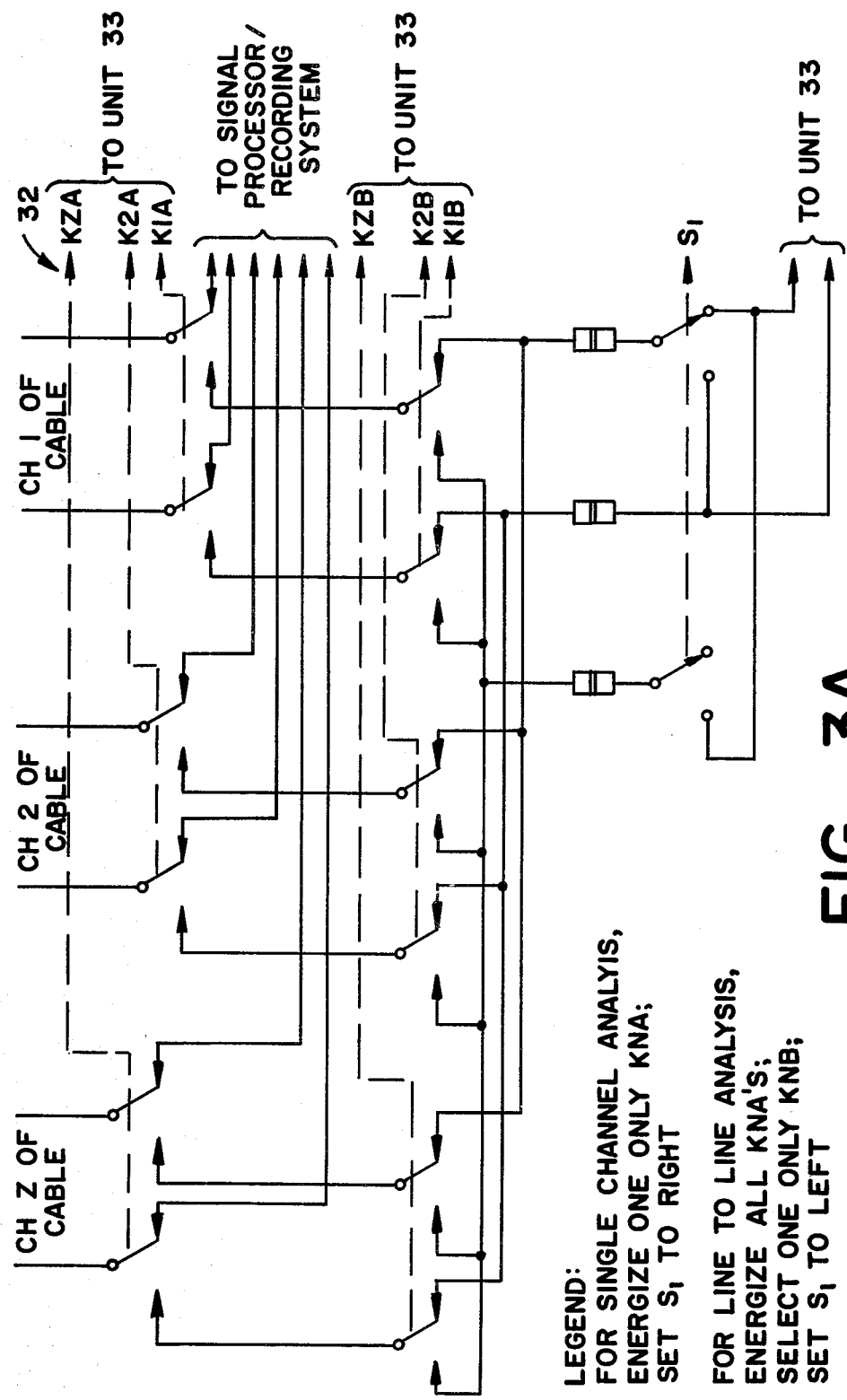

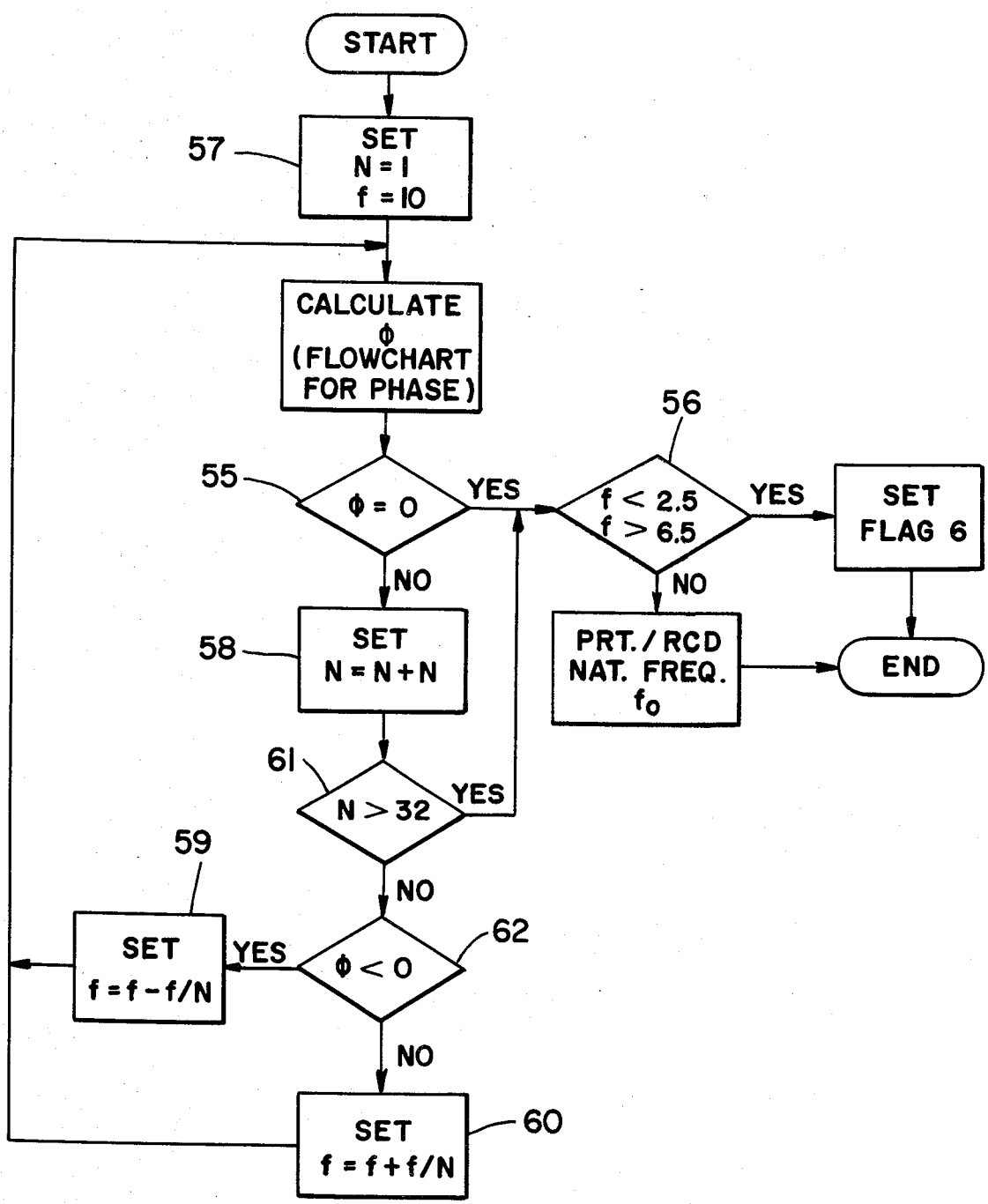
FIG_4a

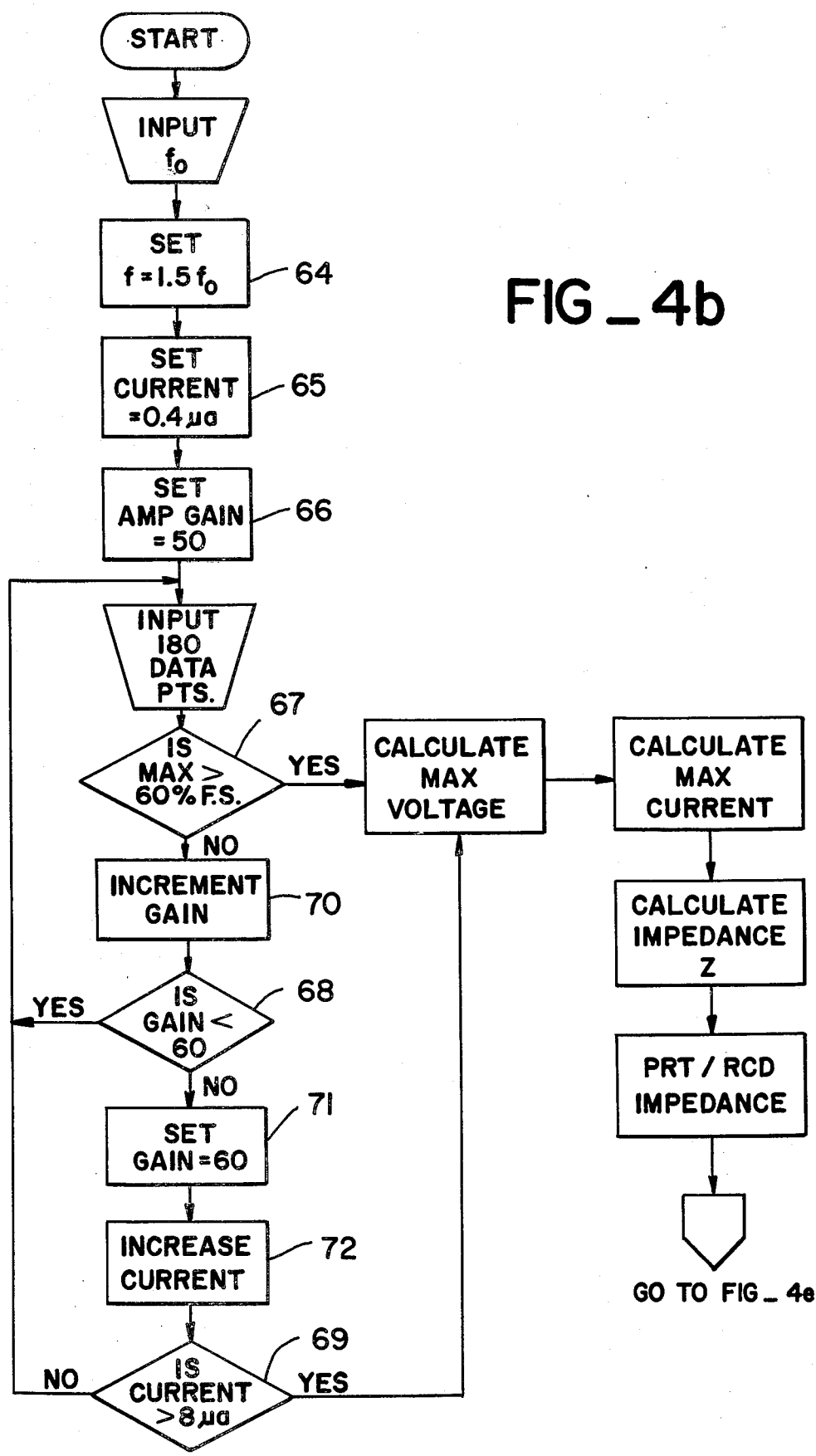
FIG_4b

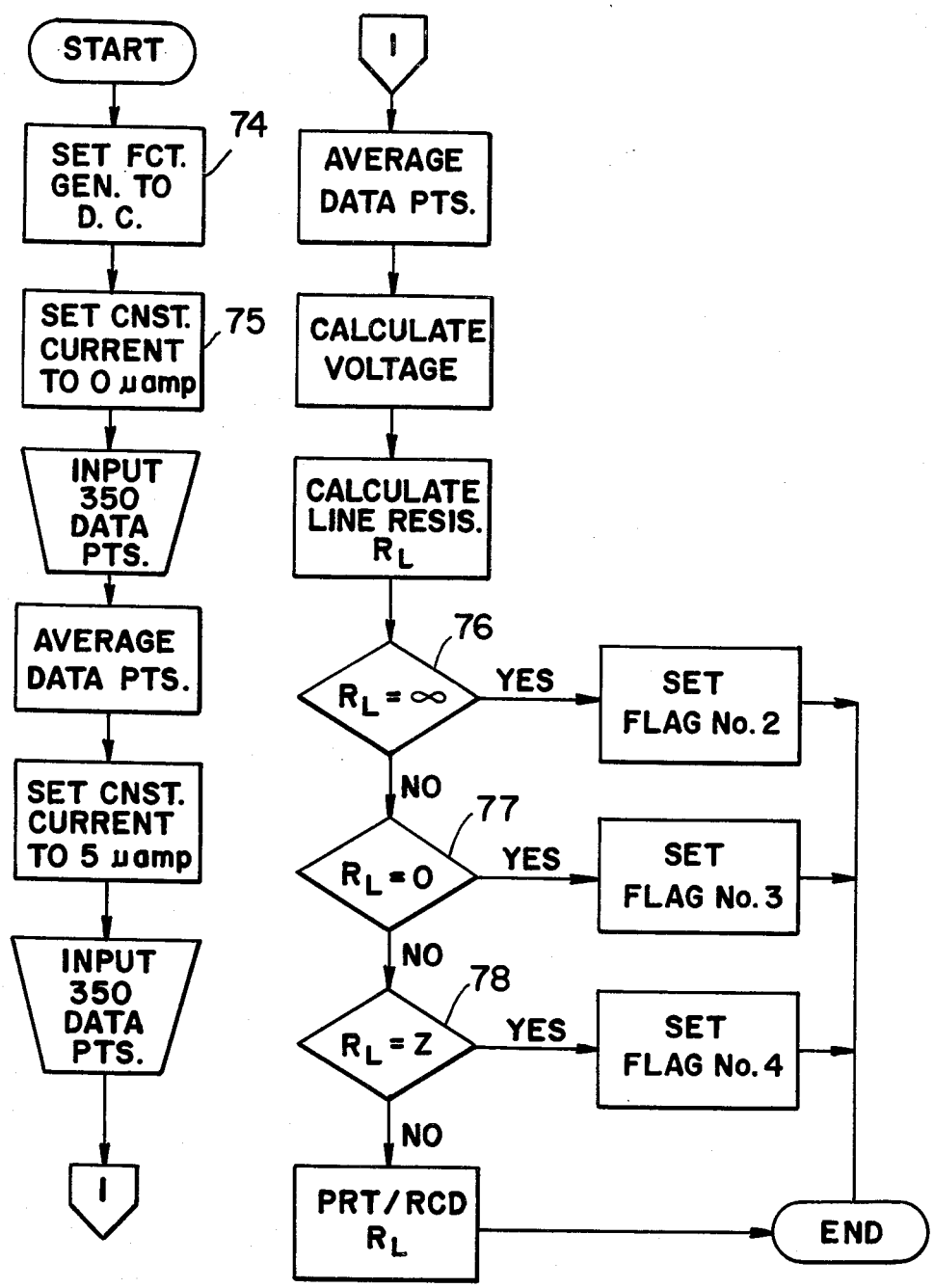
FIG_4c

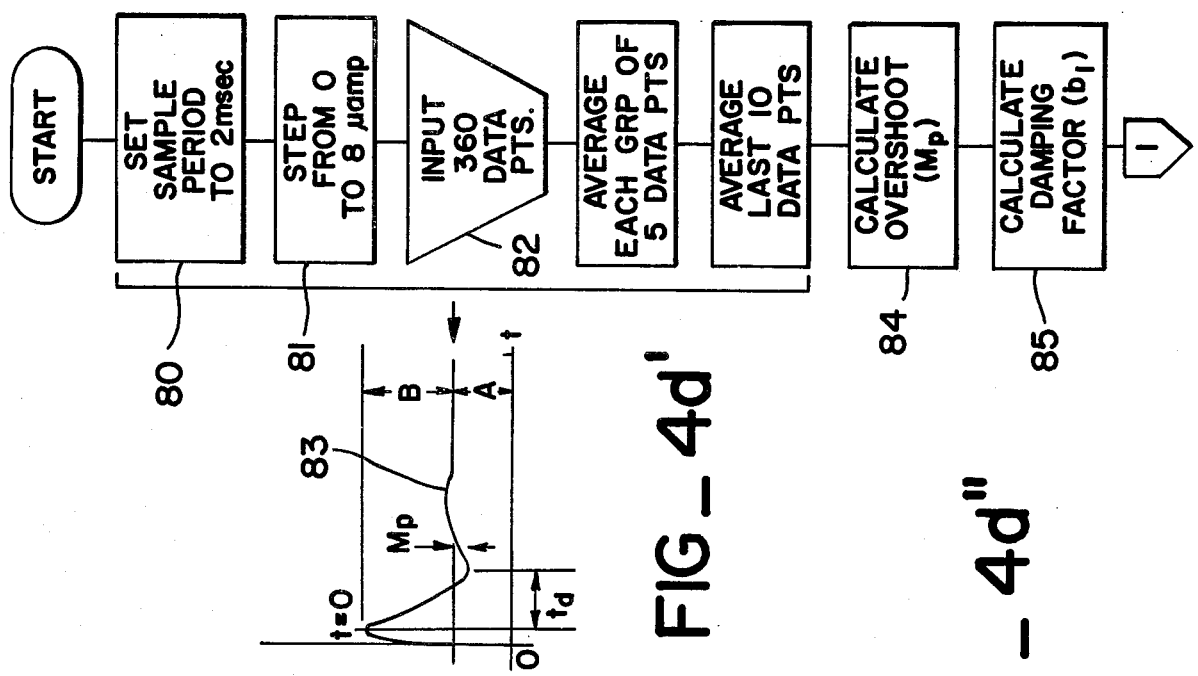
FIG_4d'
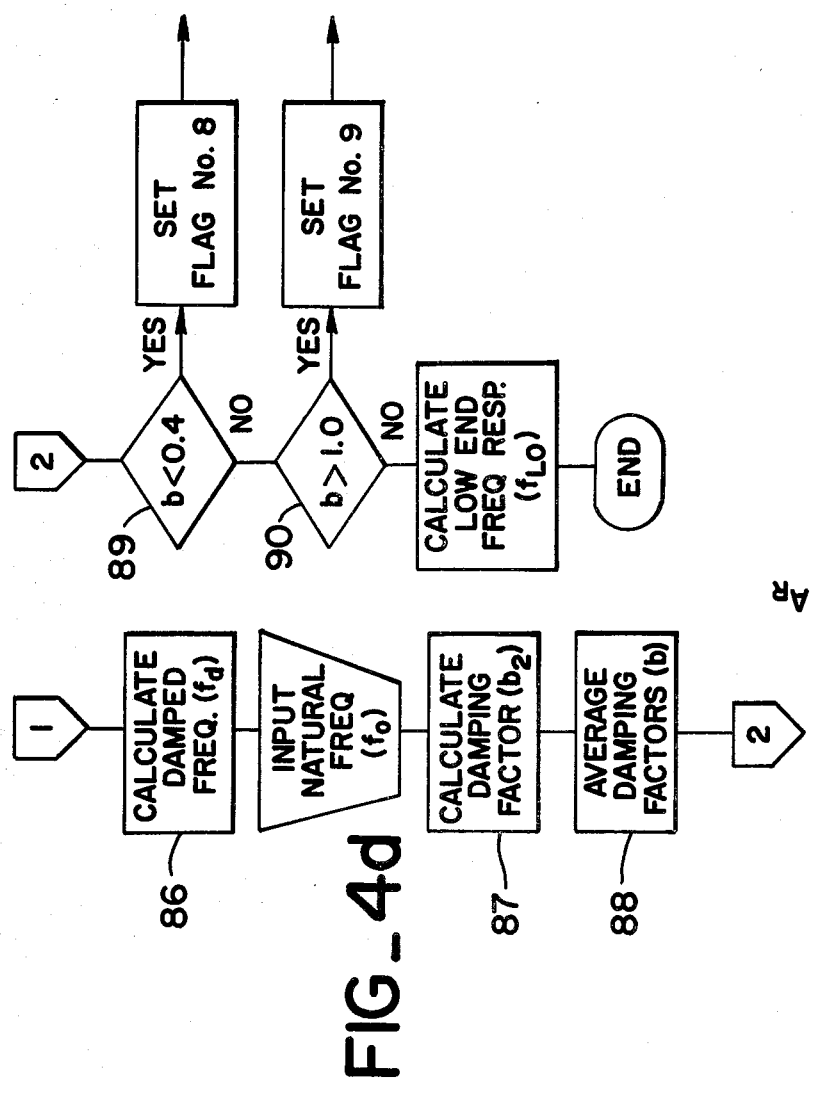
FIG_4d
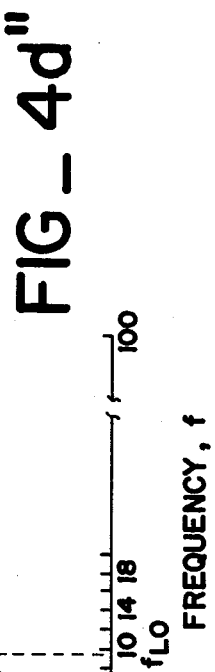
FIG_4d"

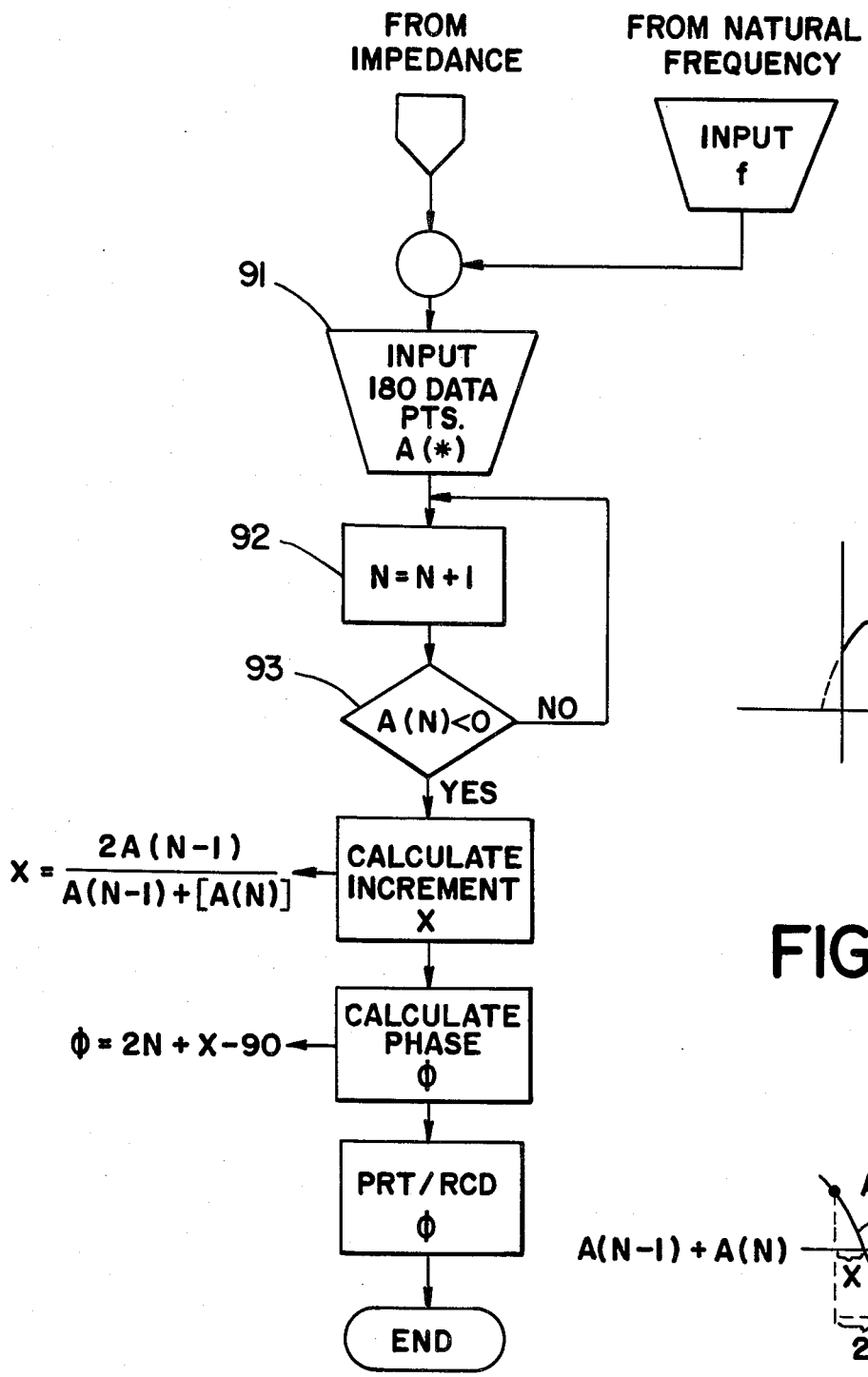
FIG_4e
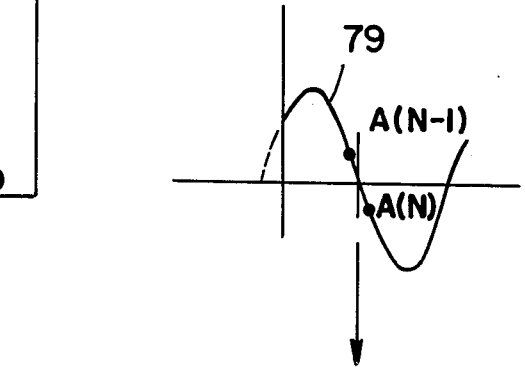
FIG_4e'
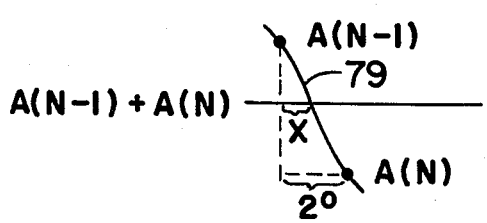
FIG_4e"

FIG_5

SIGNATURE DATA

GROUP NO.    1

DATE: Dec 14, 19-
TIME: 10:21:08

FREQ =         5.1
IMPED=        2145
PHASE=          -6

LINE RESIS=   1023

DAMP RATIO=   0.76
NAT FREQ=      3.4
LOW END FREQ ±5%
RESPONCE       =10

GROUP IS O.K.

---

SIGNATURE DATA

GROUP NO.    1

DATE: Dec 14, 19-
TIME: 10:14:11

GROUP DEFECTIVE
-SECONDARY SIDE
OF X'FMR IS
OPEN

---

SIGNATURE DATA

GROUP NO.    1

DATE: Dec 14, 19-
TIME: 10:14:57

GROUP DEFECTIVE
INPUT TO MARSTEST
IS SHORTED

FIG_8

GROUP NO.    1

DATE: Dec 14, 19-
TIME: 10:24:34

GROUP OUT OF
TOLERANCE

FREQ =           4.9

PHASE ANGLE =  -2.4
SIG. PH. ANG. = -6.0
XPH. ANG. DEV=  -60

IMPEDANCE =     629
SIG. IMPED.=   2133
%IMPED. DEV.=   -71

SHORT CIRCUIT
LOCATED AT GROUP
                  1

---

GROUP NO.    1

DATE: Dec 14, 19-
TIME: 10:25:25

INPUT TO MARSTEST
SHORTED

---

GROUP NO.    1

DATE: Dec 14, 19-
TIME: 10:25:51

OPEN CIRCUIT

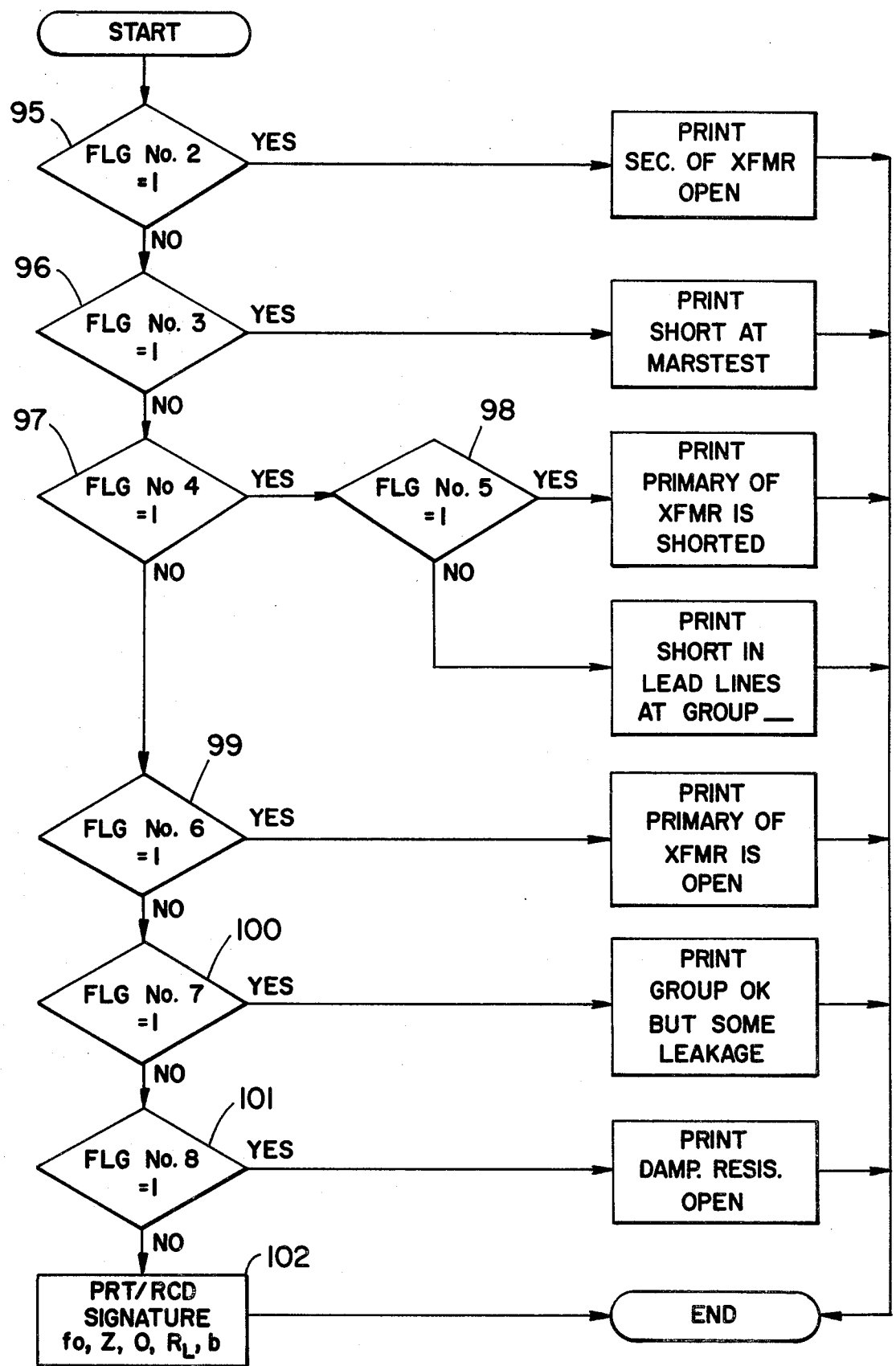
FIG_6

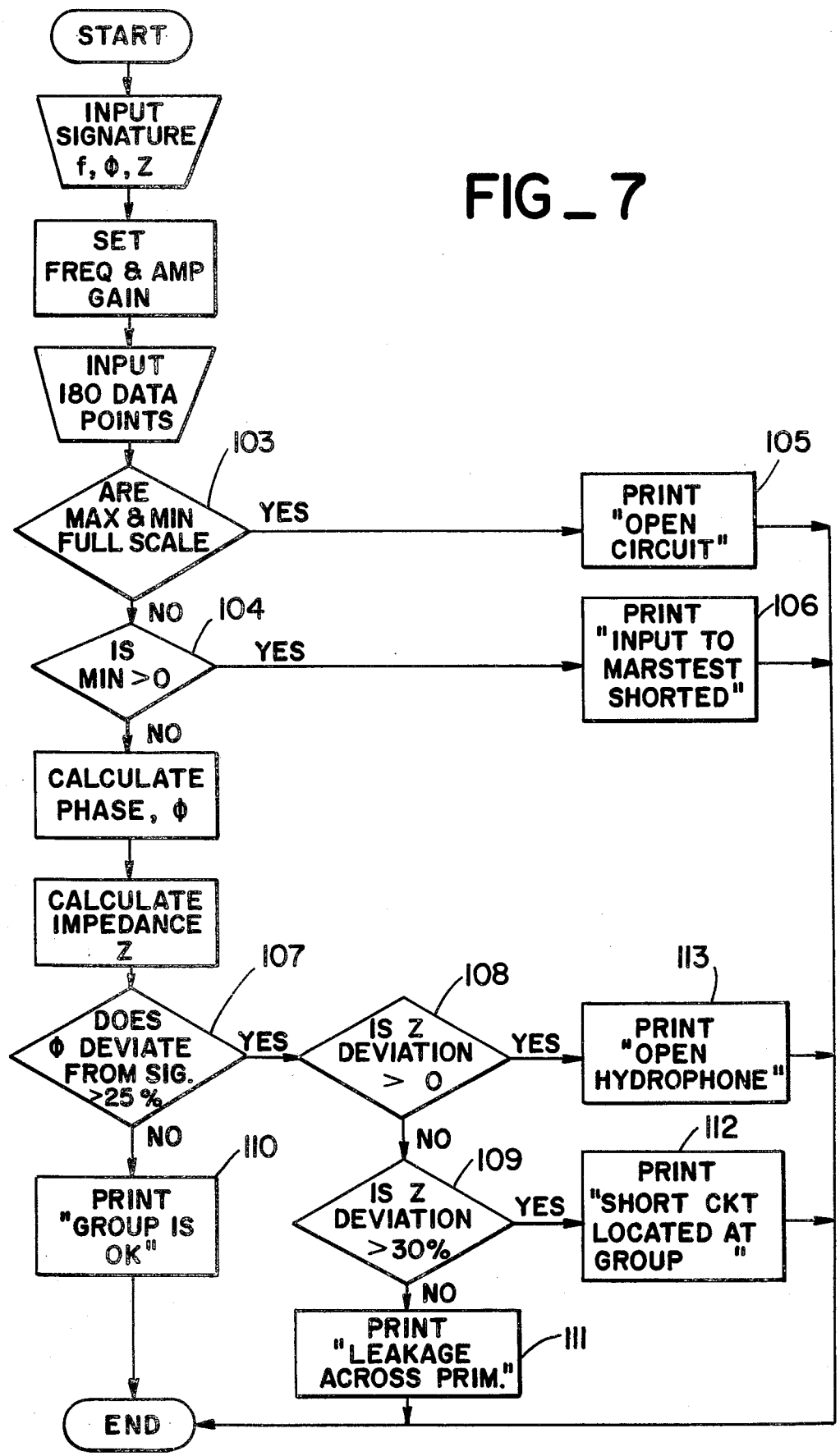

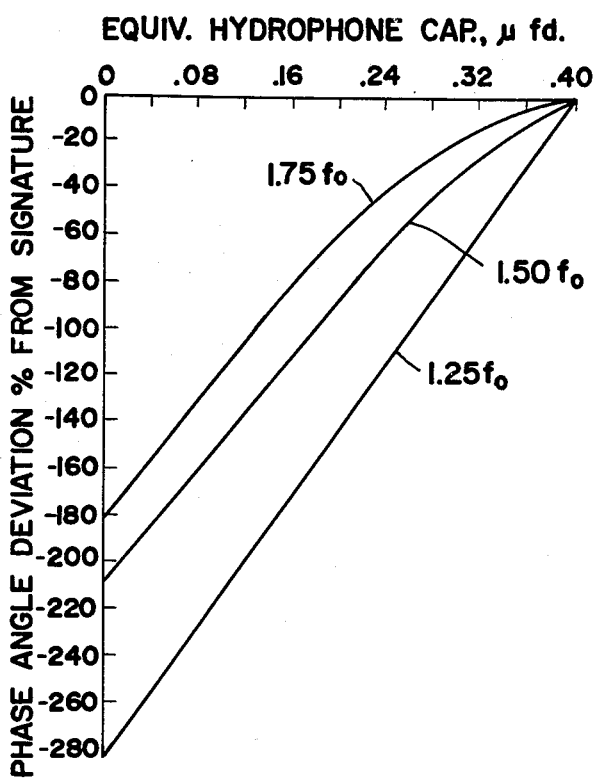
FIG_9a
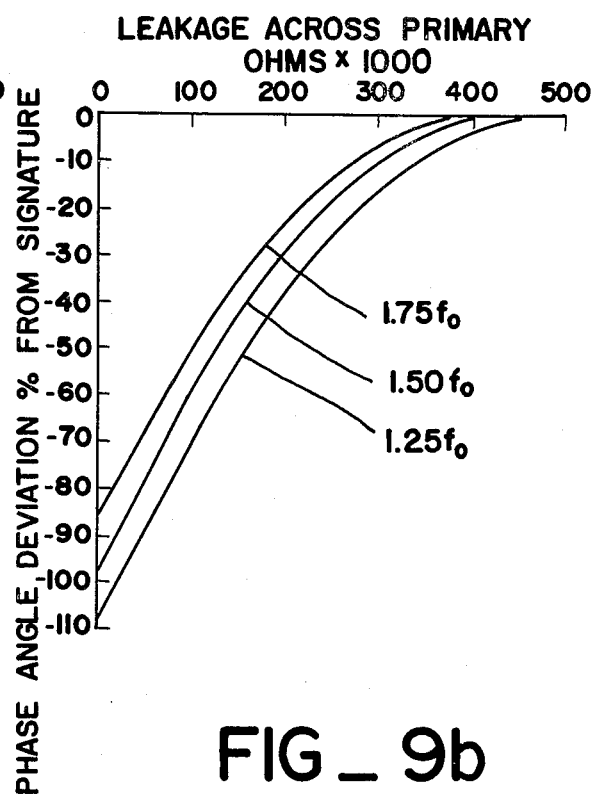
FIG_9b
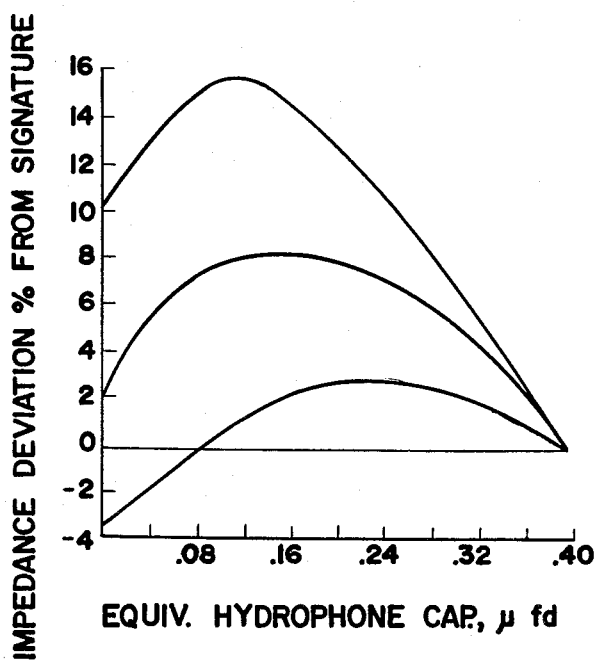
FIG_9c
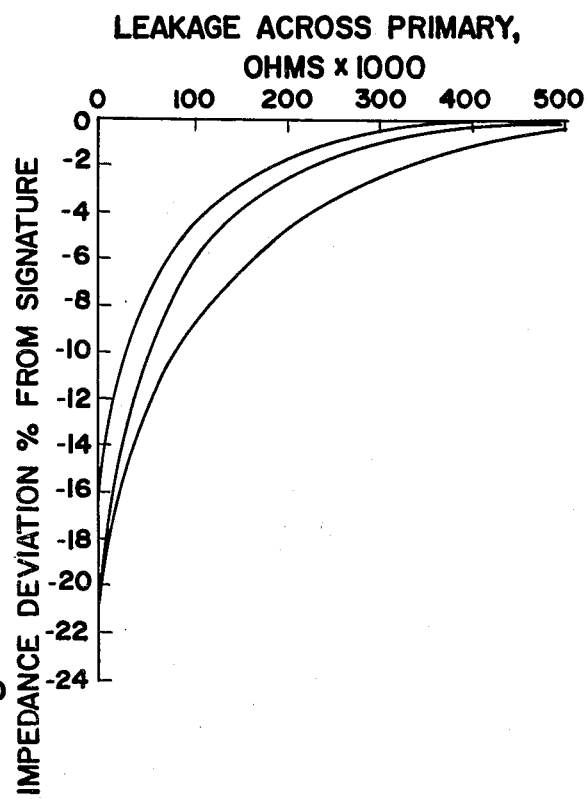
FIG_9d

4,233,677

AUTOMATIC SYSTEM AND METHOD FOR TESTING MARINE STREAMERS OF SEISMIC EXPLORATION SYSTEMS

SCOPE OF THE INVENTION

This invention relates to testing field-worthiness of marine streamers of seismic exploration systems of both passive and dynamic environments. In one aspect, acceptable "signature" characteristics of a hydrophone section of each marine streamer—say any 2 or more of a set of 5 performance parameters—are held in memory of a digital computer housed aboard a marine exploration vessel and are compared, in a dynamic fashion, during actual marine operations to latter-produced values. Result: poor or nonperforming hydrophones or hydrophone groups can be quickly identified and any seismic data acquired thereby can be properly interpreted in view of malfunctioning state of the hydrophone section.

BACKGROUND OF THE INVENTION

While prior art test systems have been available, at least in some fashion, to evaluate hydrophone group performance of seismic exploration systems, none test the hydrophone sections on a reproducible basis while the sections are operating in passive or dynamic states, especially in a form compatible with modern digital computer technology.

SUMMARY OF THE INVENTION

In accordance with the present invention, a series of hydrophone sections $X_1, X_2 \ldots X_n$ of a marine seismic exploration system are not only automatically evaluated but also are thereafter dynamically monitored during actual field operations, by a marine streamer test system and method (MARSTEST) of the present invention. In one aspect, a relay array of the MARSTEST system is interfaced with a programmed mini-computer via a signal-conditioning unit housed aboard a seismic exploration boat. As the relay array is stepped through a series of switching conditions or states, each hydrophone section is placed in circuit with the minicomputer through the signal-conditioning unit. Two modes of operation are contemplated:

(i) during passive evaluation of each hydrophone section $X_1, X_2 \ldots X_n$, the mini-computer controls the activation of different circuit elements within the signal-conditioning unit, the latter being connected to the different hydrophone sections of interest through the relay array. Each circuit element is programmed as to its operating sequence. Changes in operating limits can also be provided. Then, signals are fed to the mini-computer, the mini-computer automatically manipulating, calculating, and then comparing the generated test parameters of each hydrophone section to pre-programmed absolute ranges of values. If the generated values are not within upper and/or lower limits, an audio alarm network can be activated, as can a printer, both connected to computer output ports which message the operator the nature of the suspected malfunction. Result: the malfunctioning hydrophone section can be repaired or replaced or otherwise accounted for before actual field operations begin.

(ii) during the dynamic aspects of operation, i.e., between activation ("shooting") of the seismic source, the present invention provides for the internal comparison of selected newly acquired test parameters with previously stored "signature" values of the same parameters. It should be noted that not all test parameters acquired during the passive evaluation of the hydrophone section are used during dynamic testing. In this regard, the changes, if any, of the phase angle and impedance parameters when measured near the natural frequency of each hydrophone section have proven to be highly indicative of field-worthiness during dynamic testing of the section. If the selected test parameter is found not to be within the selected allowable range, again the alarm network and printer can be activated in the manner previously described to warn the operator of a possible hydrophone section malfunction. Result: the seismic data acquired by the suspected malfunctioning hydrophone section can be properly interpreted in view of that condition.

BRIEF DESCRIPTION OF THE DRAWINGS

FIG. 1 is a side elevation (partially schematic) of a marine seismic exploration system illustrating an exploration boat and a typical marine seismic streamer, the streamer including a series of hydrophone sections $X_1, X_2 \ldots X_n$, each capable of being placed in circuit with the marine streamer test system (MARSTEST) of the present invention;

FIG. 2 is a typical schematic diagram of circuit elements comprising each hydrophone section $X_1, X_2 \ldots X_n$, of FIG. 1;

FIG. 3 is a schematic circuit diagram of the MARSTEST system of FIG. 1; FIG. 3A is a schematic of a relay array of the circuit of FIG. 3;

FIGS. 4A–4E are flow charts illustrating operation of the MARSTEST system of FIG. 3 for generating a set of five (5) test paramters useful in the evaluation portion of the present invention;

FIGS. 6 and 7 are yet another set of flow diagrams illustrating further operational aspects of the MARSTEST system of FIG. 3;

FIGS. 5 and 8 are schematic diagrams illustrative of the computer diagnostic printouts provided by the MARSTEST system of the present invention; and FIGS. 9A–9D are plots of hydrophone test parameters versus various electrical characteristics illustrative of how performance standards within each hydrophone section under test can be established.

DESCRIPTION OF PREFERRED EMBODIMENTS OF THE INVENTION

Reference should now be had to FIG. 1, illustrating an exploration boat 10, behind which trails a marine streamer 11 partially submerged below surface 12 of a body of water 13. Aboard the boat 10 can be a seismic source (not shown) which can be periodically activated to generate seismic waves. In operation, these waves pass downwardly through the body of water 13, strike boundaries of different strata within the earth below the body of water 13 and are reflected upwardly towards and eventually received at marine streamer 11.

Aboard the boat 10 is a processing and recording system (not shown) within instrument house 9 ("doghouse") by which permanent records of the received signals are made. Also aboard the boat 10 is a marine streamer test system (MARSTEST) 14 also housed within the instrument house 9. The purpose of the MARSTEST system 14: as detailed below, to indicate field-worthiness of hydrophone sections $X_1, X_2 \ldots X_n$ in passive and dynamic environments.

Briefly, in order to test the integrity of each hydrophone section $X_1, X_2 \ldots X_n$, MARSTEST system 14 of the present invention is first activated, placing the system in circuit with each hydrophone section $X_1, X_2 \ldots X_n$, in sequence, say via reel doghouse cable 17, reel 18, lead-in cable 19, pig segment 20 and stretch section 21. Between selected hydrophone section $X_1, X_2 \ldots X_n$, is a series of depth transducer units 22, while at the trailing end of the hydrophone section $X_n$ is a buoy 23.

In order to better appreciate and understand the operation of the MARSTEST system 14 of the present invention, an understanding of hydrophone sections $X_1, X_2 \ldots X_n$ is in order and is presented below with reference to FIG. 2.

As shown in FIG. 2, each of the series of hydrophones $X_1, X_2 \ldots X_n$ is composed of a plurality of hydrophones 25 that are parallel with each other and with secondary windings 26 of transformer 27. Transformer 27 also includes primary winding 28; winding 28 connects through resistors 29a and 29b and thereafter upline to either (i) signal processing and receiving circuitry (not shown) aboard the exploration boat 10, say within doghouse 9 as previously mentioned, or (ii) the MARSTEST system 14 of the present invention. Each set of conductors $N_1, N_2 \ldots N_n$ of the hydrophone section is individually addressed by the MARSTEST system 14 of the present invention, as described below.

FIG. 3 illustrates the MARSTEST system 14 of the present invention in more detail.

As shown, the MARSTEST system 14 includes a computer unit 31 in circuit with a relay array 32 through a signal-conditioning unit 33. The relay array 32, in turn, is in circuit with the hydrophone sections $X_1, X_2 \ldots X_n$ undergoing testing.

Computer unit 31 includes a processor/controller unit 34 having conventional computer elements, namely a core memory, logic and arithmatic units and appropriate I/O registers, preprogrammed in the manner to be described below to carry out various evaluation steps to determine field-worthiness of each hydrophone section $X_1, X_2 \ldots X_n$. Of some importance are the peripherals attachable to the processor/controller unit 34. These include an LED display 35, a printer 36, a keyboard 37, and a tape casette drive unit 38. The above-listed peripherals are addressed via buses 39, and aid in determining integrity of each hydrophone section. The processor/controller unit 34 is also seen to receive data from the signal-conditioning unit 33 via data bus 40, passing therein through duplex interface 41, as well as to address various elements within the signal-conditioning unit 33 through the interface unit 42 and address bus 43.

Signal conditioning unit 33 includes various circuit elements connected to computer unit 31 through address bus 43, viz., sine wave function generator 44, digital-to-analog (DAC) converter 45, constant current generator 46, variable gain amplifier 47, high-cut filter 48 and clock 49. The variable-gain amplifier 47 is seen to be connected to analog-to-digital converter 50 via switch 51 and high-cut filter 48. The clock 49, of course, paces all operations. These elements cooperate in operations to determine field-worthiness of the sections $X_1, X_2 \ldots X_n$ as described below.

Operational aspects: briefly, in operation the signal conditioning unit 33 generates the required electrical signals to test the sections $X_1, X_2 \ldots X_n$ attached through terminals 53 and relay array 32. Result: 5 basic measurements of performance for each section $X_1, X_2 \ldots X_n$ can be determined: 1) impedance; 2) phase angle; 3) natural frequency 4) damping ration; and 5) DC line resistance.

Of importance in obtaining the above-listed test parameters is sine wave function generator 44 of the signal conditioning unit 33, which generates a sinusoidal signal whose frequency can be varied in 0.1-Hz steps. The wave is digitally constructed through a binary sine table, say at 3600 words per cycle, contained in a read-only-memory (ROM). The computer 31 controls maximum amplitude over a 0 to 5 voltage range in 0.020 voltage steps. Excellent frequency stability is achieved through a crystral-controlled oscillator in conjunction with phase-lock-loop circuity (not show), as described in detail in U.S. Pat. No. 4,039,806, assigned to the assignee of the present invention.

After the sinusoid is digitally constructed, an analog equivalent of the signal is generated by the DAC 45, and then used to control the output of constant current generator 46. If the DAC 45 is set within ±5 volts, the generator will have a sinusoidal 10 microamp output. Such signal, when applied to the hydrophone sections $X_1, X_2 \ldots X_n$, connected to the test terminals, provide a resulting voltage that can be associated with several of the test parameters of interest. The voltage response, in turn, can be amplified by amplifier 47, converted to digital values by AD converter 50 and stored within the computer 31.

Synchronization is achieved by first noting that the analog-to-digital conversion rate (by the AD converter 50) is controlled by the sine wave function generator 44. While the resulting digital voltage signal is divided into any number of conversions per data point cycle (although 180 is preferred) and its amplitude varies as a function of the addressed data point, its cycle always starts at the data point coincident with the maximum amplitude of the synthesized sine wave produced by the generator 44. In this way, the time-frame of the digital voltage signal of AD converter 50 is always known.

Relay array 32 includes a series of relays having input and output switch contacts, the input contacts to connect to conductors $N_1, N_2 \ldots N_n$ of hydrophone sections $X_1, X_2 \ldots X_n$ of the marine streamer. The array 32 as shown in FIG. 3A permits two operating modes for two sets of output contacts via operation of electromechanical armatures (not shown) of the array 32: (i) a recording mode in which the sections connect to signal processing and recording circuitry (not shown) when the hydrophones are being used to detect seismic signals; and (ii) a test mode in which the streamer sections $X_1, X_2 \ldots X_n$ are sequentially connected to signal conditioning unit 33 via terminals 53.

Essentially, in operation, each hydrophone section $X_1, X_2 \ldots X_n$ is connected in sequence to unit 33, viz., to test terminals 53 of unit 33, via the relay array 32. Note that whichever hydrophone section is being analyzed, i.e., section $X_1$, $X_2$ or $X_n$, the remainder are routed through the array 32 to the signal processor/recorder aboard the exploration vessel. But normally seismic data are not being collected during tests. Moreover, the present invention has an override feature that prevents interrupting the normal collection of seismic data to test field-worthiness of the hydrophone sections. Whenever the seismic processing and recording unit aboard the boat is active, there can be no interruptions to test for performance parameters using the MARSTEST system 14 of the present invention because the operation of event marker unit 54 in circuit between the recording system and the relay array 32 prevents same. In addition to selecting the hydrophone group for analysis, the array 32 also measures cross-talk between channels through the determination of the conductance between the selected channel and all other channels connected in series.

Operation of the MARSTEST system is best illustrated in conjunction with flow charts of FIGS. 4A-4E, esspecially to FIG. 4A, illustrating the operation of the present invention to obtain the natural frequency of each hydrophone section $X_1, X_2 \ldots X_n$.

Briefly, in accordance with FIG. 4A, the basic approach is to change the frequency of the input signal via sine function generator 44 until a zero phase shift exists between the originally generated synthesized wave and the voltage signal produced across test terminals 53, FIG. 3. Eventually at steps 55 and 56, a determination of the final frequency is made in which the final value must fall within the preselected model frequency range of between 2.5 to 6.5 Hz. The system is capable of defining the natural frequency to within 0.1 Hz. While for the particular hydrophone sections tested, the frequency of acceptance was in the range from 2.5 to 6.5, this range can vary for other hydrophone circuits. If the final frequency does not fall without these established limits, a flag can be set within the computer, such bit being useful in the evaluation of each section as, explained below, At step 55, if phase angle is not zero, the frequency of the input signal is incremented and the phase shift re-analyzed, again between the synthesized reference sine wave, and the new signal produced across the test terminals 53 using acceptable frequency step functional changes in steps 59 and 60.

Now, in more detail, in FIG. 4A, the incrementing algorithms for changing the frequency of the input are established in steps 57, 58, 59 and 60. Decision steps occur at 55 and 56 (previously mentioned) as well as at 61 and 62. At 61, note that the incrementation process stops if n is greater than 32. At step 62, if the phase angle is greater or less than 0, calculation steps 59 or 60, as indicated in FIG. 4A, are brought into play so that eventually, at step 55, the decision step can be made by which the final frequency falls within the preselected model frequency range of step 56.

FIG. 4B illustrates the flow chart for determining impedance of each hydrophone section $X_1, X_2 \ldots X_n$.

Briefly, the impedance is determined using an input signal having a frequency equal to 1.5 times the natural frequency in order to achieve better measurement stability while still retaining good sensitivity. Briefly, the computer sets the measurement current and amplifier gain to obtain a signal approximately 60% of full scale of available computer capacity and the current is limited to a maximum of 8 microamps to avoid saturation of the hydrophone section transformer, as determined by model-testing procedures.

Now, in more detail, in FIG. 4B, steps 64, 65 and 66 relate to the initialization by the computer of the various related circuit elements within the signal conditioning unit 33 of FIG. 3. In this regard, the input signal is at a frequency which is 1.5 times the natural frequency, such step occurring at step 64. Further, the current is set at 0.4 microamps at step 65, and the amplifier gain setting is set at 50 at step 66.

Decisional steps occur at 67, 68 and 69.

After 180 data points are input for analysis, the decision step 67 determines whether or not maximum value is of 60% full scale of available computer capacity. If it is, the maximum voltage, the maximum current and the impedance are determined. If not, the gain is incremented at step 70 and a new set of data taken and the process repeated. At step 68, if the gain is less than 60, the gain is incremented, the test is repeated, and the new set of data re-analyzed. If the gain is more than 60, however, the next steps 71 and 72 set new circuit parameters with the result, i.e. at step 69, that if the current is less than 8 microamps, the test is repeated for a new set of data points. Above that value, however, the maximum voltage, the maximum current and the impedance are determined.

FIG. 4C illustrates a flow chart for determining DC line resistance of each streamer section $X_1, X_2 \ldots X_n$.

Briefly, as shown, the resistance is determined by applying a constant current (DC) to the particular section under test and measuring the resulting voltage at the test terminals 53 of the signal conditioning unit 33, FIG. 3. The nominal DC resistance of the transformer secondary is subtracted, leaving only the line resistance for analysis. A flag (labeled No. 2) is set if the line resistance equals infinity; another flag (labeled No. 3) is set if the line resistance equals zero; and yet another flag (labeled No. 4) is set if the line resistance equals the impedance. These flags are stored in the computer for later use, as described below.

Now, in more detail, in FIG. 4C, the computer initializes relevant circuit elements of the signal conditioning unit 33 of FIG. 3 to perform the line resistance tests for the particular hydrophone section, as required. For example, constant current generator 46 is initialized at steps 74 and 75. Thereafter, a set of 350 data points associated with the signal produced at the test terminals 53 are fed to the computer, and their average value determined. Thereafter, the current generator 46 is incremented and a new series of test data provided, so as to provided the line resistance in the manner previously indicated.

Note the decisional steps at 76, 77 and 78.

At 76, if the line resistance is equal to infinity, the flag (labeled No. 2) is set within the computer.

At 77, if the line resistance is zero, the flag (labeled No. 3) is set within the computer.

At 78, if the line resistance is equal to the calculated impedance, yet another flag (labeled No. 4) is set within the computer.

If the decision steps 76, 77 or 78 are negative, the line resistance is printed and recorded within the computer.

FIG. 4D is a flow chart of the measurement of the damping ratio b.

Briefly the ratio b is determined by subjecting the particular hydrophone section $X_1, X_2 \ldots X_n$ to an 8-microamp step change in current and performing a second-order analysis on the resulting transient signal produced at test terminals 53 of FIG. 3. Two independent analyses are performed: (1) a first damping ratio $b_1$ is determined based on the amount of overshoot of the first peak, and then (2) a second damping ratio $b_2$ is determined based on the period between peaks and the relationship to the natural frequency. The first and second damping ratios are then averaged to provide the damping ratio b. If b is less than a prescribed value, say 0.4, a flag (labeled No. 8) is set within the computer. If the damping ratio b is greater than a selected value, say 1, then yet another flag (labeled No. 9) is set within the computer. Having the damping ratio and the natural frequency, the computer then calculates a limit frequency at which response exceeds 5% of the flat-value response of the hydrophone section.

Now, in more detail, in FIG. 4D, initialization occurs at step 80, the computer controlling the signal conditioning unit 33 of FIG. 3 so as to set the sampling period at about 2 milliseconds. Thereafter, the computer then causes a step change at step 81, followed by input of a set of 360 data points at step 82.

FIG. 4D' shows a typical response curve 83 in analog format provided by the steps 80-82. Thereafter, each 5 data points are averaged, as are the last 10 data points.

Steps 84 and 85 calculate overshoot ($M_p$) and calculate the damping factor $b_1$. The formulas set forth below show that for a unit step change that overshoot ($M_p$) and damping factor ($b_1$) can be calculated in accordance with:

$$\text{FOR UNIT STEP CHANGE;}$$
$$M_p = \frac{B}{A - \text{MINIMUM}}$$
$$b_1 = \frac{\ln M_p}{[\pi^2 + (\ln M_p)^2]^{\frac{1}{2}}}$$

At steps 86, 87 and 88 various values of interest are calculated, viz., damped frequency, damping factor $b_2$ and average damping factor $b$ in accordance with:

$$f_d = \frac{1}{2\,t_d}$$
$$b_2 = [1 - \left(\frac{f_d}{f_o}\right)2]^{\frac{1}{2}}$$
$$b = \frac{b_1 + b_2}{2}$$

Note the decisional steps at 89 and 90.

At 89, if damping factor b is less than a particular preselected value, say 0.4, for the particular hydrophone sections of interest, a flag within the computer (labeled No. 8) is set.

In step 90, if the damping factor b is greater than a particular value, say 1.0 for the particular hydrophone sections of interest, another flag is set (labeled No. 9) within the computer.

Thereafter, the low end of frequency response of the hydrophone section ($F_{LO}$) is calculated in accordance with the formula $$f_{LO} = \left\{ \frac{f_o^2(4A_Rb^2 - 2A_R^2) \pm [8A_R^2b^2(4b^4 - A_R) + 4A_R^2]^{\frac{1}{2}}f_o^2}{2(1 - A_R^2)} \right\}^{\frac{1}{2}}$$

FIG. 4E illustrates a flow chart for measuring the phase angle in accordance with the present invention.

Briefly, as shown in FIG. 4E, the phase angle is a measurement of degrees between the digitally constructured sine wave provided within the signal conditioning unit 33 and the measured voltage signal provided across test terminals 53 (FIG. 3). Another definition of phase angle is the degrees of separation between the current and voltages developed across a selected hydrophone group circuit, as at the test terminals 53 of the signal conditioning unit 33.

As noted earlier with regard to FIG. 3, the analog-to-digital converter 50 is controlled by the sine function generator 44, and in order to construct the synthesized sine wave, the sine function generator 44 provides that its first digital point addressed is the maximum point of value within the sine wave look-up table. The sine function generator 44 then digitizes a 180-word-per-cycle reference trace which is fed to the computer. In this regard, the synthesized wave is constructed such that it can be synchronized with later-occurring events such as its zero crossing always being addressed by the 45th data address point within the computer. Coincidentally, across the test terminals 53 of signal conditioning unit 33 of FIG. 3 appears the measured voltage as illustrated by the trace 79 of FIGS. 4E' and 4E''. And the phase shift between the above two signals can then be determined by counting the number of data address points exceeding the 45th data address point in memory.

Now, in more detail, as shown in FIG. 4E, step 91 shows the reference digital signal as designated A(*). That reference signal measured across the test terminals 53 of FIG. 3 is fed to the computer for analysis. Note that step 93 is a decisional step in which it is determined whether or not the amplitude of the measured signal [(A)N] is or is not greater than zero. If it is, then another sample [(A)N+1] is examined. Thereafter, when for the first time the amplitude is determined to be less than zero, i.e., the signal has crossed the zero crossing point, a calculation is made in which the incremental distance X along the time scale, usually with reference to the 45th reference address point, is determined. Basis of calculation:

$$X = 2A(N-1)/A(N-1) + [(A)N]$$

where the above terms are defined by FIGS. 4E' and 4E''. Thereafter the phase angle is determined by the relationship $$\text{phase angle} = 2N + X - 90.$$

DESCRIPTION OF THE INVENTION DURING EVALUATION AND MONITORING OF INDIVIDUAL STREAMER SECTIONS $X_1, X_2, \ldots X_n$ As previously indicated, the MARSTEST system 14 of the present invention is capable of measuring field-worthiness of hydrophone sections in both dynamic and passive conditions.

In the passive condition, the hydrophone sections $X_1, X_2, \ldots X_n$ of FIG. 1 are evaluated in accordance with five (5)test parameters previously indicated, and these test parameters for the most part are measured against absolute standards. If in the evaluation stages the parameters are not within preselected values, internal flags are set within the computer. Result: visual and audio alarms are activated.

In this regard note that in Tables I and II, below, particular flag settings as provided in FIGS. 4A–4E can be correlated with adverse conditions within the particular hydrophone section under test.

TABLE I

| FLAG No. | CONDITION TO SET FLAG |
|---|---|
| 2 | LINE RESIS = ∞ |
| 3 | LINE RESIS = O |
| 4 | LINE RESIS = IMPED. |
| 5 | FLG 4 & IMPED > CALC LINE RESIS. |
| 6 | $f_o$ OUT OF LIMITS |
| 7 | DAMP. FACTOR > 1.0 |
| 8 | DAMP. FACTOR < 0.4 |

TABLE II

| STREAMER GROUP CONDITION | FLAG SETTING | | | | | | |
|---|---|---|---|---|---|---|---|
| | 2 | 3 | 4 | 5 | 6 | 7 | 8 |
| 1. XFMR. SECONDARY OPEN | 1 | 0 | 0 | 0 | 1 | 0 | 1 |
| 2. SHORT AT MARSTEST | 0 | 1 | 1 | 0 | 1 | 1 | 0 |
| 3. SHORT IN LEAD LINES | 0 | 0 | 1 | 0 | 1 | 1 | 0 |
| 4. XFMR PRIMARY SHORTED | 0 | 0 | 1 | 1 | 0 | 0 | 0 |
| 5. XFMR PRIMARY OPEN | 0 | 0 | 0 | 0 | 1 | 1 | 0 |
| 6. SOME LEAKAGE ACROSS PRIMARY | 0 | 0 | 0 | 0 | 0 | 1 | 0 |
| 7. DAMPING RESISTOR OPEN | 0 | 0 | 0 | 0 | 0 | 0 | 1 |
| 8. GROUP O.K. | 0 | 0 | 0 | 0 | 0 | 0 | 0 |

For example, in Tables I and II, a setting of flag No. 2 means that line resistance of the particular hydrophone section is equal to infinity, while a setting of flag No. 3 means the line resistance is zero. In Table II, it is noteworthy to mention that a multi-bit code (formed of zero's and one's) can also be useful in evaluating hydrophone sections. Such code is indicative of particular streamer conditions of an adverse nature. As indicated, abnormalities can include opens, shorts, or leakage on both the primary and secondary side of the transformer of the particular hydrophone section, open damping resistors, open hydrophones and anomalies in the input leads. All the above cause an alarm (a series of "beeps") to sound and the malfunction diagnosis to be printed out in manner of the output of FIG. 5. Complete evaluation requires about 30 seconds per streamer section, and is normally performed as the streamer is maneuvered into a recording line at sea, although onshore evaluation can also occur. Assuming an evaluation sequence requires 30 seconds, a streamer of 48 hydrophone sections can be easily evaluated in about 25 minutes.

FIG. 6 is a flow chart illustrating the steps in evaluation of a hydrophone section based on generation of single bits or multi-bit codes in accordance with Tables I and II, supra.

Briefly, note the decision steps in FIG. 6 at 95–101, such decision steps resulting in the generation of various "messages", i.e., both printed legends, as shown in FIG. 5, and the sounding of audio alarms. Of particular interest are decision steps 97 and 98, which combine to either determine if (1) if the primary winding of the transformer of the particular hydrophone section is shorted, or (2) the lead lines to the particular hydrophone sections are shorted.

Step 102 is symbolic of the recording in memory of the signatures of each tested section, such signatures being useful in subsequent comparison of later-generated values, as described below. That is to say, at step 102, if no flag bits are activated, the streamer section is judged to be satisfactory and the five (5) characteristic measurements mentioned above are placed in memory within the computer. At least a portion of the signatures are particularly useful in the monitoring phase of each hydrophone section under dynamic monitoring conditions.

Now in more detail, in the monitoring mode of operation, the streamer sections $X_1, X_2, \ldots X_n$ of FIG. 1 are sequentially checked during actual exploration maneuvers, i.e., between activation of the seismic source aboard the exploration vessel.

FIG. 7 is a flow chart illustrating steps involved in monitoring hydrophone sections $X_1, X_2, \ldots X_n$ under dynamic conditions.

In this regard, two test parameters are of particular merit: impedance and phase angle. Each of these characteristics, when measured and compared against previous signatures, are highly indicative of continuing field-worthiness of particular hydrophone sections.

Briefly, natural frequency, impedance and phase angle for a particular hydrophone section are assumed to be held in memory, the latter two values having been determined at 1.5 times the natural frequency, as previously described. Then the hydrophone sections are tested using similar techniques previously described to gain new values. For example, the circuit elements within signal conditioning unit 33 of FIG. 3 are re-set and the new test results fed to the computer. Two tests are made initially: (1) the maximum-minumum full-scale responses are checked to see if open circuit conditions have occurred, i.e. step 103; and (2) the minimum response is checked to see if such response is greater than zero, such condition indicating a short, see step 104.

Phase angle and impedance are then calculated. The group is judged good if the phase angle deviates less than a selected value determined from the prior values, say less than 25% from the signature phase angle within the computer memory. If the detected value is more, i.e., greater than 25%, the direction of impedance deviation is then checked. A deviation of "+" denotes open hydrophones, while a decrease in a "−" direction indicates leakage. Impedance deviations of more than an all-over limit, say 30%, indicates a short in the lines leading to the particular hydrophone section under test. If there is a short in the line, the computer calculates the location of the short and prints out same, as shown in FIG. 8.

Now in more detail with respect to FIG. 7, note the decision steps at 103–104. At 103 and 104, the "full-scale" maximum and minimum responses of the particular hydrophone section are determined, with appropriate messages being generated (from the computer to the operator), if the particular value is not within prescribed limits at steps 105 and 106.

As the printed message is produced, there is also an appropriate audio signal, as previously indicated.

At decision steps 107, 108 and 109, the deviation range of the phase angle and impedance allow for the generation of various printed messages at steps 110–113, in order to indicate continued field-worthiness (or faultiness) of the particular hydrophone section undergoing test.

Of some importance in the generation of the malfunction messages is, of course, the establishment of deviation ranges for particular values of interest as used in steps 107–113.

In regard to establishing such deviation criteria, a test model should be constructed of the particular hydrophone streamer to be used in the field. Thereafter, various malfunctions can be simulated and results noted. As a consequence, satisfactory deviation limits can be established so that field-worthiness of particular hydrophone sections can be assured.

FIGS. 9A–9D illustrate results from actual simulation tests.

Note that the phase angle of FIGS. 9A and 9B is indicative of circuit malfunction. In FIG. 9A, the 1.5 times the natural frequency trace shows that a change of 0.1 microfarad results in about −30% deviation. Experience shows that such deviation is equivalent to about ¼ of the hydrophones in the particular section being open, an intolerable operating condition. FIG. 9B shows that water leakage in the form of a 200,000-ohm resistance across the hydrophone also results in about −30% deviation.

While impedance values in FIGS. 9C and 9D also change with circuit malfunction, the percentage deviation is much less. What is significant, however is that open hydrophones cause a positive deviation of impedance (FIG. 9C), while leakage within the hydrophone section causes a negative change in impedance (FIG. 9D). If the phase angle deviation is −25% or less, the array of hydrophones in the particular hydrophone group is usually acceptable within present performance standards, i.e., for a streamer having the performance characteristics set forth below.

The apparatus and method of the present invention have been successfully implemented and tested, using the following elements and equipment:

| | |
|---|---|
| Computer 31 | |
| Processor/Controller 34 | |
| Hewlett-Packard 9825A | |
| Interface 42 | |
| Hewlett-Packard IB | |
| I/O 41 | |
| Duplex-16 bit | |
| Signal Conditioning Unit 33 | |
| Function Generator 44 | Range: 0–160 Hz |
| DAC 45 | Range: 0–5 volts |
| Current Generator 46 | Ranges: 0–10 uamp |
| | 0–100 uamp |
| Variable Gain Amplifier 47 | Range: 0–150 |
| Filter 48 150, 500; | 2.5 K, 5 K, |
| | Bypass |
| | (Roll off frequency) |
| A/D Converter 50 | 12 bit |
| Relay Array 32 | Range 0–48 settings |
| Hydrophone Sections $X_1, X_2, \ldots X_n$ | |
| Resistors 29a = 1200 ohms | |
| 29b = 500 ohms | |
| Transformer: SIE 6822 | |
| Hydrophones - 26 hydrophones per section | |
| $x_n = 48$ | |

| RELATED PATENTS ASSIGNED TO THE INSTANT ASSIGNEE AND INCORPORATED HEREIN BY REFERENCE | | |
|---|---|---|
| U.S. Pat. No. | Inventor(s) | Issue Date |
| 4,015,202 | Fredriksson et al | 3/29/77 |
| 4,039,806 | Fredriksson et al | 8/2/77 |
| 4,043,175 | Fredriksson et al | 8/23/77 |
| 4,052,694 | Fredriksson | 10/4/77 |
| 4,070,618 | Thomas | 1/24/78 |

While certain preferred embodiments of the present invention have been specifically disclosed, it should be understood that the invention is not limited thereto as many variations will be readily apparent to those skilled in the art. Hence the invention is to be given its broadest possible interpretation within the terms of the following claims.

What is claimed is:

1. A method of testing a marine streamer of a seismic marine exploration system in a passive or a dynamic state, said streamer including a series of hydrophone sections $X_1, X_2, \ldots X_n$, each containing a plurality of hydrophones and being transformer-coupled via a set of marine conductors $N_1, N_2, \ldots N_n$ to a marine streamer test system aboard an exploration boat, comprising the steps of:

(a) driving one of said sections $X_1, X_2, \ldots X_n$ with an analog signal A of known characteristics applied directly to terminals of said one section;

(b) detecting an analog signal B across one of said set of conductors $N_1, N_2, \ldots N_n$ in response to said drive signal A;

(c) converting said signal B to digital values;

(d) automatically performing at least one of a series of test measurements $Z_1, Z_2, \ldots Z_m$ using a programmed digital computer of said marine system aboard said boat to determine field-worthiness of said one section $X_1, X_2, \ldots X_n$;

(e) by means of said digital computer automatically comparing one or more of test measurements $Z_1, Z_2, \ldots Z_m$ with previously stored values $Z'_1, Z'_2, \ldots Z'_m$ so as to determine change in operating characteristics of said sections $X_1, X_2, \ldots X_n$.

2. The method of claim 1 in which said one of test measurements $Z_1, Z_2, \ldots Z_m$ is the natural frequency of said one section $X_1, X_2, \ldots X_n$.

3. The method of claim 2 in which steps (a) and (b) are further characterized by signal A being a sinusoidal drive current of known frequency and by signal B being a sinusoidal voltage signal responsive to said signal A, and step (d) is further characterized by automatically incrementing changes in frequency of signal A using said computer until zero phase shift occurs between signals A and B, as indicated in digitized form within said computer.

4. The method of claim 1 in which said one of test measurements $Z_1, Z_2, \ldots Z_m$ is the impedance of said one section $X_1, X_2, \ldots X_n$.

5. The method of claim 4 in which steps (a) and (b) are further characterized by signal A being a sinusoidal drive current of known frequency and by signal B being a sinusoidal voltage response signal thereto, and step (d) is further characterized by changing signal A so that signal A will not saturate a transformer of said one section and response signal B is less than full scale, and calculating maximum voltage, maximum current and impedance therefrom.

6. The method of claim 1 in which said one of test measurements $Z_1, Z_2, \ldots Z_m$ is the DC line resistance of said one section $X_1, X_2, \ldots X_n$.

7. The method of claim 6 in which steps (a) and (b) are further characterized by signals A and B being DC current and voltage signals, respectively, and step (d) is further characterized by incrementing signals A and B so as to determine DC line resistance after DC resistance of a transformer secondary of said one section $X_1, X_2, \ldots X_n$ is subtracted.

8. The method of claim 1 in which said one of test measurements $Z_1, Z_2, \ldots Z_m$ is damping ratio of said one section $X_1, X_2, \ldots X_n$.

9. The method of claim 8 in which steps (a) and (b) are further characterized by signal A being a step change in drive current and by signal B being a transient signal in response thereof, and step (d) is further characterized by determining (i) a first damping ratio $b_1$ based on first response peak overshoot; (ii) a second damping ratio $b_2$ based on period between peaks and on natural frequency; and (iii) an average damping ratio b equal to $[b_1+b_2]/2$.

10. The method of claim 1 in which said one of test measurements $Z_1, Z_2, \ldots Z_m$ is phase angle of said one section $X_1, X_2, \ldots X_n$.

11. The method of claim 10 in which steps (a) and (b) are further characterized by signal A being a sinusoidal drive current of known frequency and by signal B being a sinusoidal voltage signal responsive to said signal A, and step (d) is further characterized by automatically synchronizing digitization of signals A and B such that a known zero crossing address point of signal A can be related to closely adjacent address points of said signal B to determine phase angle of response of said one section $X_1, X_2, \ldots X_n$.

12. In testing a marine streamer of a seismic marine exploration system in a passive or dynamic state, said streamer including a series of hydrophone sections $X_1, X_2, \ldots X_n$ each containing a plurality of hydrophones and being transformer-coupled via a set of marine conductors $N_1, N_2, \ldots N_n$, to provide seismic data to seismic processing and recording circuitry aboard an exploration boat, a marine streamer test system also aboard said exploration boat connected to said sets of marine conductors, comprising:

(i) a relay array means comprising input contacts connected to said sets of marine conductors, first and second sets of output contacts adjacent to said input contacts, and bridging electrical means for controllably connecting said input contacts and either said first or said second sets of contacts in bridging electrical contact, said first set of output contacts being connected to said seismic processing and recording circuitry aboard said boat;

(ii) a signal conditioning means including terminal means controllably connectable to said second set of output contacts so as to test said streamer for field-worthiness, said conditioning means including
  (a) means for directly driving one of said sections $X_1, X_2, \ldots X_n$ with an analog signal A of known characteristics via said terminal means;
  (b) means for detecting an analog signal B across one of said set of conductors $N_1, N_2, \ldots N_n$ in response to said drive signal A;
  (c) means for converting said signal B to digital values; and (iii) programmed digital computer means connected to said signal conditioning means for controlling said drive means, said detecting means and said digitizing means, as well as automatically performing at least one of a series of test measurements $Z_1, Z_2, \ldots Z_m$ to determine field-worthiness of said one section $X_1, X_2, \ldots X_n$.

13. Said marine test system of claim 12 in which said means for driving said one section with an analog signal A under control of said digital computer means is a constant current generator.

14. Said marine test system of claim 12 in which said means for driving said one section with an analog signal A under control of said digital computer means is a sine wave function generator connected through digital-to-analog converter (DAC) to said one section.

15. Said marine test system of claim 12 in which said means for detecting said analog signal B and means for digitizing said signal B under control of said digital computer means is a variable amplifier in circuit with an analog-to-digital converter (ADC).

16. Said marine test system of claim 12 in which said computer means additionally automatically compares one or more of said test measurements $Z_1, Z_2, \ldots Z_m$ with stored like values to indicate authenticity and stability of said testing method.

17. Said marine test system of claim 16 in which said computer means includes alarm and printer means to be automatically activated to visually and audibly warn that said one or more test measurements $Z_1, Z_2, \ldots Z_m$ are not within specification limits.

18. Said marine test system of claim 12 in which said computer means additionally automatically compares one or more of test measurements $Z_1 \ldots Z_m$ with stored prior-obtained like signature values $Z'_1 \ldots Z'_m$ so as to determine change in operating characteristics of said sections $X_1, X_2, \ldots X_n$.

19. Said marine test system of claim 18 in which said computer means includes alarm and printer means to be automatically activated to visually and audibly warn that one or more test measurements $Z_1 \ldots Z_m$ has changed under operating conditions.

20. Said marine test system of claim 19 in which said one or more test measurements $Z_1 \ldots Z_m$ are impedance and phase angle values only.

21. Said marine test system of claim 12 in which $X_n=48$, $N_n=48$, and $Z_m=5$.

22. Said marine test system of claim 12 in which $X_n=48$, $N_n=48$ and $Z_m=2$.

* * * * *